United States Patent
Fleming et al.

(10) Patent No.: US 6,836,124 B2
(45) Date of Patent: Dec. 28, 2004

(54) CAPACITANCE MONITORING SYSTEMS

(75) Inventors: Patrick Fleming, Henley-en-Thames (GB); Lee Coleman, Maidenhead (GB)

(73) Assignee: Beta Lasermike Limited, Buckinghamshire (GB)

( * ) Notice: Subject to any disclaimer, the term of this patent is extended or adjusted under 35 U.S.C. 154(b) by 99 days.

(21) Appl. No.: 10/182,766

(22) PCT Filed: Jan. 25, 2001

(86) PCT No.: PCT/GB01/00315

§ 371 (c)(1), (2), (4) Date: Nov. 12, 2002

(87) PCT Pub. No.: WO01/57544

PCT Pub. Date: Aug. 9, 2001

(65) Prior Publication Data

US 2003/0128038 A1 Jul. 10, 2003

(30) Foreign Application Priority Data

Feb. 4, 2000 (GB) .............................. 0002487

(51) Int. Cl.⁷ .................... G01R 31/08; H01H 31/02; H04B 3/46
(52) U.S. Cl. .................... 324/519; 324/537; 324/539; 324/540
(58) Field of Search ................ 324/519, 537, 324/539, 543, 76.19, 76, 557, 558, 658, 679

(56) References Cited

U.S. PATENT DOCUMENTS 3,748,577 A  7/1973  Jones, Jr.
6,498,499 B1 * 12/2002  Sikora ........................ 324/661

FOREIGN PATENT DOCUMENTS

| EP | 0 394 525 A1 | 10/1990 |
| EP | 0 942 291 A2 | 9/1999 |
| GB | 2 003 613 A | 3/1979 |

OTHER PUBLICATIONS

International Search Report of PCT/GB01/00315, dated Apr. 12, 2001.
British Search Report of corresponding application 0002487.7, dated May 16, 2000.
International Preliminary Examination Report of PCT/GB01/00315, dated Feb. 16, 2002.

* cited by examiner

Primary Examiner—Anjan Deb
Assistant Examiner—John Teresinski
(74) Attorney, Agent, or Firm—Christie, Parker and Hale, LLP

(57) ABSTRACT

A capacitance monitoring system includes a capacitance gauge head for monitoring the capacitance between a measuring electrode and an electric cable travelling along a path parallel to the measuring electrode. The output from the capacitor gauge head is fed to a Fast Fourier Transform device (40) to produce, to indicate discrete cyclical faults in the cable and the frequencies to which they would be relevant. A cable speed detector (44) feeds a reference table device which stores different correction factors to correct the amplitude of the cyclical faults detected due to the attenuation imposed on the measured signal because of the specific length of the electrode. A multiplier (46) multiplies the cyclical fault signals detected by the relevant factors from the reference table device (42).

6 Claims, 5 Drawing Sheets

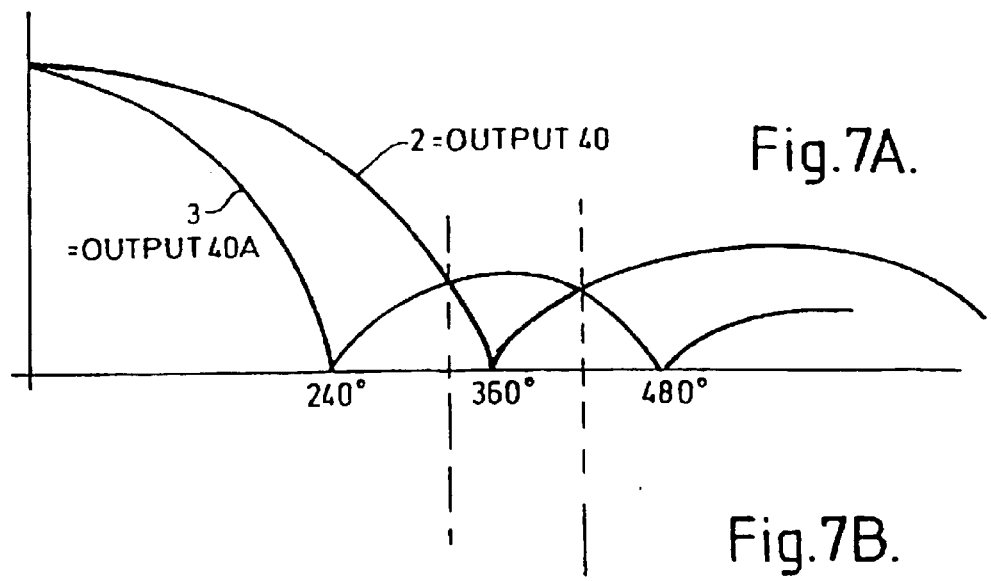
Fig. 7A.
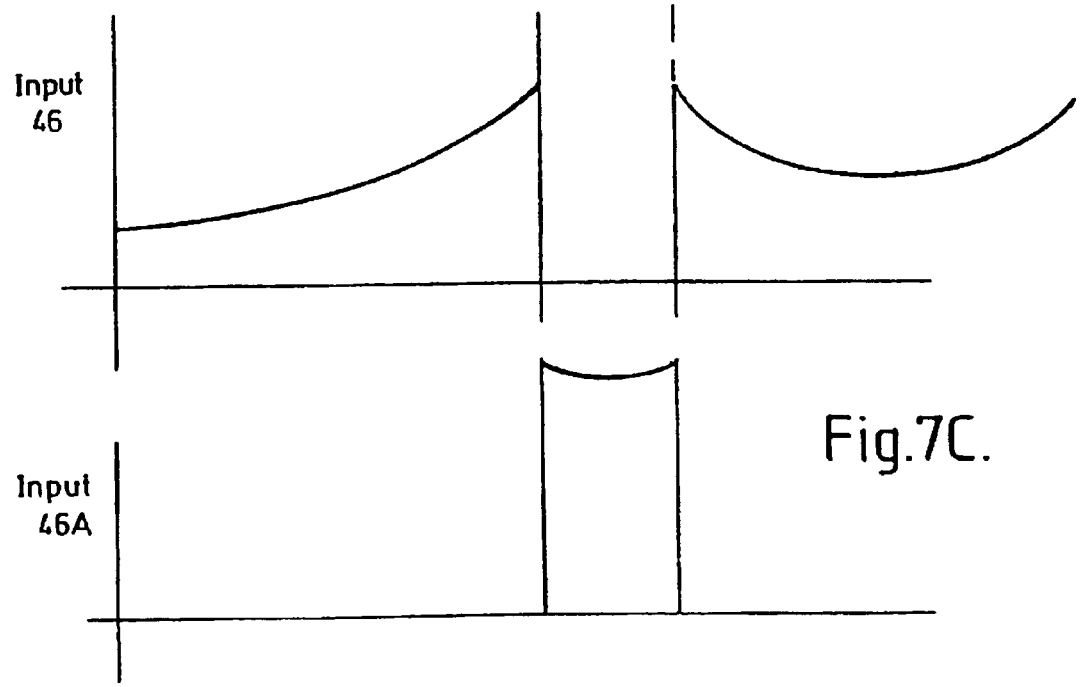
Fig. 7B.
Fig. 7C.

Fig.8.

| | ELECTRODE 2 | ELECTRODE 3 |
|---|---|---|
| 10 | 0.999 | 0.997 |
| 20 | 0.995 | 0.989 |
| 30 | 0.989 | 0.974 |
| 40 | 0.98 | 0.955 |
| 50 | 0.969 | 0.93 |
| 60 | 0.955 | 0.9 |
| 70 | 0.939 | 0.866 |
| 80 | 0.921 | 0.827 |
| 90 | 0.9 | 0.784 |
| 100 | 0.878 | 0.738 |
| 110 | 0.853 | 0.689 |
| 120 | 0.827 | 0.637 |
| 130 | 0.799 | 0.583 |
| 140 | 0.769 | 0.527 |
| 150 | 0.738 | 0.471 |
| 160 | 0.705 | 0.413 |
| 170 | 0.672 | 0.357 |
| 180 | 0.637 | 0.03 |
| 190 | 0.601 | 0.245 |
| 200 | 0.564 | 0.191 |
| 210 | 0.527 | 0.139 |
| 220 | 0.489 | 0.09 |
| 230 | 0.452 | 0.043 |
| 240 | 0.413 | 0 |
| 250 | 0.375 | 0.04 |
| 260 | 0.338 | 0.076 |
| 270 | 0.3 | 0.108 |
| 280 | 0.263 | 0.136 |
| 290 | 0.227 | 0.16 |
| 300 | 0.191 | 0.18 |
| 310 | 0.156 | 0.196 |
| 320 | 0.122 | 0.207 |
| 330 | 0.09 | 0.214 |
| 340 | 0.059 | 0.217 |
| 350 | 0.029 | 0.216 |
| 360 | 0 | 0.212 |
| 370 | 0.027 | 0.205 |
| 380 | 0.052 | 0.194 |
| 390 | 0.076 | 0.181 |
| 400 | 0.098 | 0.165 |
| 410 | 0.118 | 0.148 |
| 420 | 0.136 | 0.129 |
| 430 | 0.153 | 0.108 |
| 440 | 0.167 | 0.087 |
| 450 | 0.18 | 0.065 |
| 460 | 0.191 | 0.043 |
| 470 | 0.2 | 0.021 |
| 480 | 0.207 | 0 |

CAPACITANCE MONITORING SYSTEMS

CROSS-REFERENCE TO RELATED APPLICATION

This application claims priority of International application number PCT/GB01/00315, filed Jan. 25, 2001, which in turns claims priority to British application number 0002487.7, filed Feb. 4, 2000.

The present invention relates to capacitance monitoring systems.

BACKGROUND OF THE INVENTION

In the manufacture of insulated electric cables, particularly cables for high performance networks such as cable TV and telecommunications networks, a uniform electrical characteristic for the cable is particularly important to avoid distortions to transmitted signals.

A previously proposed method of monitoring the cable capacitance uniform is to monitor the insulated cable as it emerges from an insulating sleeve extruder machine to determine whether or not the cable characteristics remain within predefined tolerances and/or to control the extruder machine in a sense to keep the characteristics of the cable uniform. The monitoring step typically is carried out using a coaxial capacitance gauge immersed in a bath of cooling water.

As shown in FIG. 1, the gauge consists of a cylindrical measuring electrode 2 flanked by a pair of cylindrical guard electrodes 4 and 6, each guard electrode 4 and 6 lies generally spaced from the adjacent end of the measuring electrode 2 and is coaxial therewith. The cable 8, to be monitored, is guided by guides (not shown) to travel along the common axis of the three electrodes 2, 4 and 6.

The outer diameter of the cable 8 is less than the inner diameter of the electrodes and so the gap between the cable 8 and the electrodes 2, 4 and 6 is filled with coolant 10—usually water. The water also invades the spaces between the guard electrodes 4 and 6 and the measuring electrode 2. Because water has some resistivity, there will, in effect, exist a respective resistor between the measuring electrode 2 and each guard electrode and a resistor $R_3$, $R_4$ and $R_5$ between each electrode and a respective section 8A, 8B and 8C of the opposing outer surface of the cable 8. The core 14 of the cable is a conductor which is normally earthed and so there will, in effect, exist a respective capacitor $C_1$, $C_2$ and $C_3$ between the core 14 and each surface section 8A, 8B and 8C.

FIG. 2 shows the equivalent circuit with the guard to the measuring electrode resistors being connected in parallel and represented as $R_m$. An oscillator 16 has two output terminals 18 and 20. Terminal 18 is connected to earth or the cable core 14 while terminal 20 is connected to the two guard electrodes 4 and 6.

The measuring electrode 2 and the two guard electrodes 4 and 6 are respectively connected to the two inputs of a differential amplifier 20 with a negative feedback through impedance 22. The feedback loop drives the electrode 4 to keep the electrode 2 at the same potential as the two guard electrodes. The value of the resistors $R_3$, $R_4$ and $R_5$ representing the resistance of the water between the electrodes and the cable 8 are low relative to the impedance of their corresponding capacitors $C_2$, $C_3$ and $C_1$ and the input impedance of the amplifier 20 is sufficiently low that the shunt resistance $R_m$ has negligible effect. The resultant output voltage from the amplifier 20 is then directly related to the capacitance of the section of cable located within the measuring electrode.

This system, however, suffers from the disadvantage that it can only measure the capacitance of a discrete length of the cable ie the length which at any time lies within the measuring electrode. Accordingly, the capacitance is the average capacitance for that length. When the extruder operates in a manner in which it produces a cyclical variations in the capacitance of the cable, the capacitive variation detected is attenuated as a function of the length of the measuring electrode.

OBJECT

It is an object of the present invention to provide an improved capacitance monitoring system.

SUMMARY OF THE INVENTION

According to the present invention there is provided a capacitance monitoring system comprising a capacitance head having a generally cylindrical measuring electrode of predetermined length encircling the path of an electric cable, velocity means for measuring the speed of the cable along said path relative to the electrode, means for providing an output signal indicative of the capacitance between the cable and the measuring electrode, a fast Fourier transform device for producing a Fourier analysis on variations in the output signal to indicate discrete cyclical faults in the cable and the frequencies of electrical signals transmitted along the cables to which said faults would be relevant, a reference table device connected to the output of the velocity means and having a reference table providing different correction factors for the attenuation to which the different cyclical faults as measured by the measuring means would be subject and multiplying means connected to the fast Fourier transform device and the reference table device to correct for said attenuation.

According to the present invention there is further provided a capacitance monitoring system comprising a capacitance head having a pair of spaced generally cylindrical measuring electrodes of different length positioned to encircle and to extend longitudinally of and lie a predetermined distance from the path of a travelling electric cable, velocity means for measuring the speed of the cable along the path relative to the electrodes, first means providing an output signal indicative of the capacitance between the cable and a first one of the electrodes, second means providing an output signal indicative of the capacitance between the second one of the electrodes and the cable, a first fast Fourier transform device for producing a first Fourier analysis of variations in the output signal from the first means to indicate discrete cyclical faults in the cable and the transmission frequencies they would effect when the cable was in use, a second fast Fourier device for producing a second fast Fourier analysis of variations in the output signal from the second means to indicate cyclical faults in the cable and the transmission frequencies they would effect when the cable was in use, reference table means for storing a first table relevant to the first electrode and a second table relevant to the second electrode of correction factors to correct for attenuation in the cyclical faults detected due to the particular length of each electrode, multiplier means connected to the reference table means and the output of the fast Fourier transform devices to correct the attenuation that the detected cyclical faults have suffered due to the lengths of the electrodes with the cyclical faults detected by the first electrode being suppressed or a range of frequencies for which the greatest attenuation occurs, and the correction of faults detected by the second electrode being suppressed over frequencies other than said range.

BRIEF DESCRIPTION ON THE DRAWINGS

Capacitance monitoring systems, embodying the present invention, will now be described, by way of example, with reference to the accompanying diagrammatic drawings, in which:

FIG. 7 is a waveform chart illustrating the operation of the system of FIG. 6; and FIG. 8 is a table of correction factors.

DETAILED DESCRIPTION OF THE INVENTION

In the manufacture of electrically insulated cables for use in high frequency applications, it is important to monitor the electrical characteristics of the cable to ensure that the cable being produced falls within predetermined tolerance requirements so that the cable being produced can be properly certified if compliance is confirmed, or rejected and corrective action taken if compliance is not confirmed.

Figure 1:
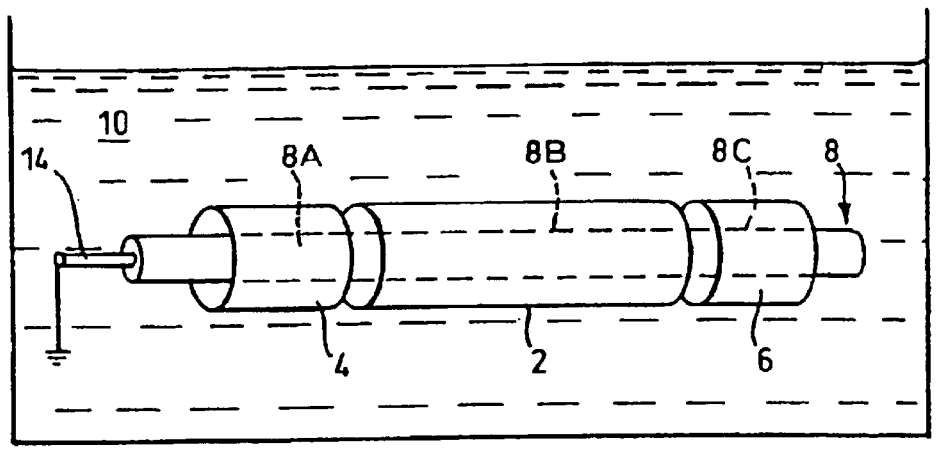
FIG. 1 is a perspective view of a previously proposed capacitance gauge.
Figure 2:
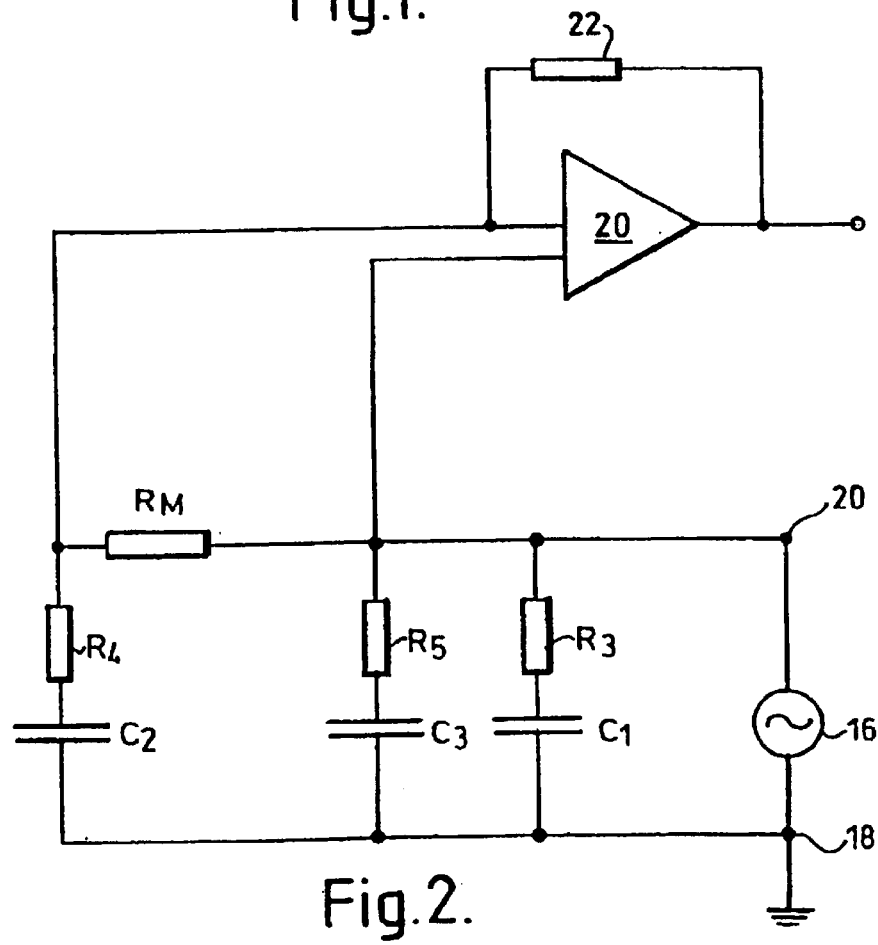
FIG. 2 is an equivalent circuit diagram of the gauge of FIG. 1 connected to a measuring circuit.

As shown in FIG. 1, the output of the operational amplifier provides an indication of the capacitance variation of the cable and therefore any cyclical variation in imperfections in the cable. Such cyclical variations can be detected and analysed by processing the output signal in a Fast Fourier Transform device. A typical output of a Fast Fourier Transform device is shown in FIG. 3, which illustrates different peaks amplitude at different frequencies, each peak representing a defect in the cable at that frequency.

The problem with the output signal from the operational amplifier 20 is that it represents the average capacitance of the cable over the length of measuring the electrode. Ideally, we would like the output signal of the amplifier 20 to represents the capacitance of the cable at a single point but a measuring electrode of zero length is impractical. Even a short length electrode eg 25 mm will provide problems because signal to noise ratios are high and the impedance of the wires and circuits connected to the electrode start to have a significant effect in the measurement process.

To maintain a satisfactory signal to noise ratio and to provide satisfactory accuracy, it has been found that a measuring electrode of some 100 mm in length (±20%) is particularly advantageous. However, a measuring electrode of such length particularly as its length approaches the wavelength at the upper end of the frequency band for which the cable is intended, will act to attenuate the higher frequency peaks shown in FIG. 3.

Figure 3:
FIG. 3 is a graph showing peak cable irregularities versus frequency.
Figure 4:
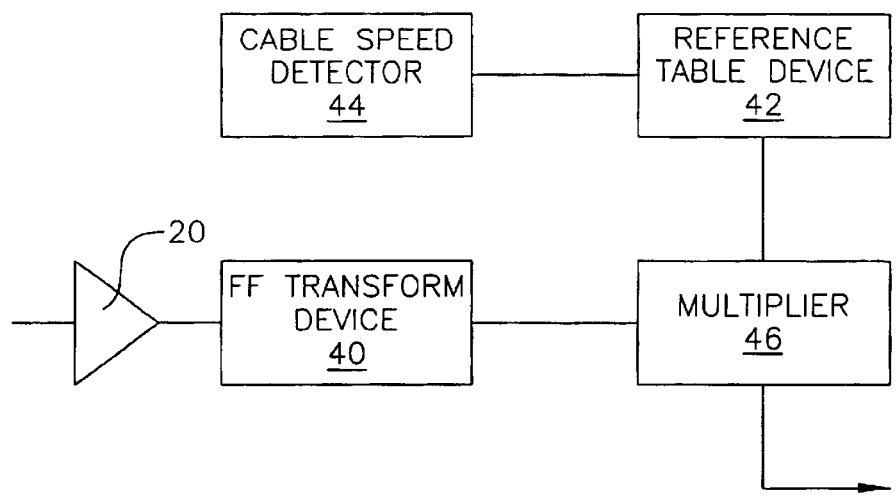
FIG. 4 is a block diagram of a monitoring system embodying the invention.

The circuit of FIG. 4 is intended to overcome this problem by using a reference table circuit to correct the amplitude of selected peaks (shown in FIG. 3).

As shown, the output of the amplifier 20 feeds a Fast Fourier Transform device 40, which conducts a Fourier analysis on the output signal. A reference table device 42 receives a signal representative of the cable velocity from a cable speed detector 44. The reference table device 42, in response to prestored data and the line speed of the cable, generates correction factors for the different frequency peaks in the output of the Fast Fourier Transform device 40. A multiplier 46 multiplies each of the signal peaks in the output of the device 40 with an appropriate amplitude correction factor and so produces a compensated version of the graph shown in FIG. 3, so that the proper magnitude of the errors can now be determined.

This arrangement, while satisfactory for cases where the wavelength of the upper frequency of the bandwidth under consideration is longer than the length of the electrode, it becomes unsatisfactory for cases where the wavelength of the upper frequency closely approaches or equals the electrode length. In the special case where the electrode is the same length as the wavelength, the averaging effect of the measurement electrode will ensure that no imperfection at that frequency is ever detected, while where the wavelength is close to the length of the electrode, attenuation of the relevant high frequency peaks, in the circuit of FIG. 3, it will be a maximum.

Figure 5:
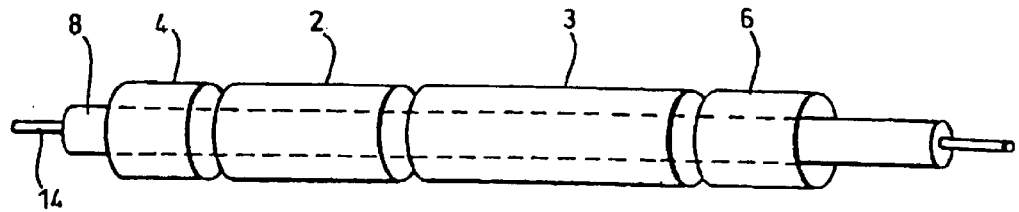
FIG. 5 is a capacitor head gauge embodying the invention.

The solution to this problem is to add a second or auxiliary electrode 3 to the capacitance gauge head of FIG. 1. In FIG. 5, parts similar to those in FIG. 1 are similarly referenced. As shown, the main electrode 2 and auxiliary electrode 3 lie coaxial with each other and the guard electrodes 4 and 6 flank the main and auxiliary electrode 2 and 3.

Each measuring electrode 2 and 3 is driven by a respective separate differential amplifier 20 and 20A supplying the modified monitoring system shown in FIG. 6 and which will be explained in more detail hereinafter.

As described, the measurement electrode 2 has a blind spot for cyclic faults occurring at a frequency having a wavelength equal to the length of the electrode and a relatively high attenuation of cyclical faults around that frequency. The auxiliary electrode will have a blind spot at a different frequency with high attenuation to cyclical faults around that different frequency. Accordingly, by switching between the two measuring electrodes, the blind spots and high attenuation characteristics can be avoided.

The table shown in FIG. 8 has three columns. When considering the cable response to any particular frequency having a generally sinusoidal variation, the length of the measurement electrode can be specified as subtending a number of degrees of that waveform. Thus, the first column of the table is the length of the electrode in degrees relative to different progressively increasing frequencies. The second column shows the attenuation which each of those frequencies, when measured by the measuring electrode 2, suffer. The third column shows the attenuation which each of these frequencies, when measured by the measuring electrode 3, suffer.

The attenuation in the performance of each electrode 2 and 3, tabulated in the table of FIG. 8, is more clearly illustrated in waveform 7A of FIG. 7. The points at which the waveforms 2 and 3 intersect represent the best points at which to switch from one measuring electrode to the other.

Figure 6:
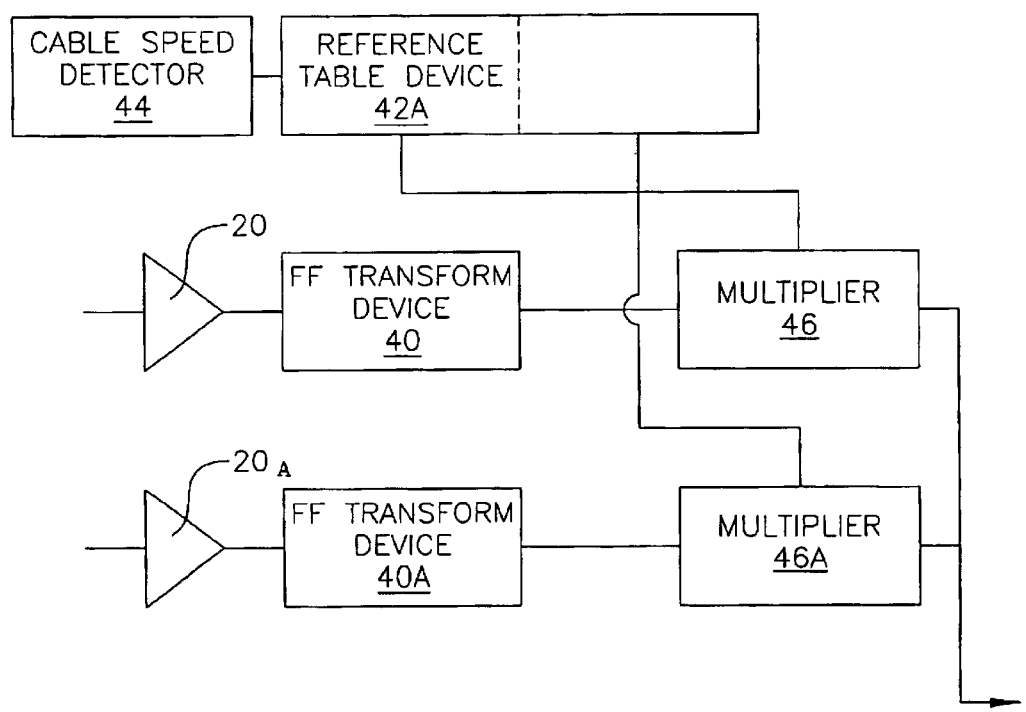
FIG. 6 is a block diagram of another monitoring system embodying the invention.

The monitoring circuit of FIG. 6 shows how this switching can be implemented.

As shown, there are two differential amplifiers 20 and 20A, one from each of the two measuring electrodes 2 and 3. The reference table device 42A holds two reference tables, one for each measuring electrode 2 and 3 and is fed with a velocity signal from a cable speed detector 44. In operation, the outputs from the amplifier 20 are fed via a Fast Fourier Transform device 40 to a multiplier 46 where the different peaks are multiplied by the appropriate factor derived from the table. At the same time, the output from the amplifier 20A is fed via a Fast Fourier Transfer device 40A to a multiplier 46A where the different peaks are multiplied by an appropriate factor derived from the table 42A. However, the reference table device 42A is structured to suppress those peaks in the output of the Fast Fourier Transfer device 40 which falls within the switch over range shown in waveform 7A while at the same time multiplying only those same peaks occurring in the output of the Fast Fourier Transfer device 40 A with an appropriate multiplying factor derived from the table. Waveforms 7B and 7C show how the two multipliers 46 and 46A take turns in processing the output signals. The output signals from the multipliers 46 and 46A are then combined for further processing.

It will be appreciated that all the processing of the outputs of the amplifiers 20 and 20A can be carried out using appropriate software thus providing a software solution as an alternative to the hardware shown.

What is claimed is:

1. A capacitance monitoring system comprising a capacitance head having a generally cylindrical measuring electrode of predetermined length encircling the path of an electric cable, velocity means for measuring the speed of the cable along said path relative to the electrode, measuring means for providing an output signal indicative of the capacitance between the cable and the measuring electrode, a Fast Fourier Transform device for producing a Fourier analysis on variations in the output signal to indicate discrete cyclical faults in the cable and the frequencies of electrical signals transmitted along the cables to which said faults would be relevant, a reference table device connected to the output of the velocity means and storing a reference table providing different correction factors for the attenuation to which different said cyclical faults as measured by the measuring means would be subject and multiplying means connected to the Fast Fourier Transform device and the reference table device to correct for said attenuation.

2. A system according to claim 1, wherein said measuring electrode has a length in the range of from 80 to 120 mm.

3. A system according to claim 1 or to claim 2, including means for monitoring the output of the multiplying means to determine whether any of said cyclical faults exceed a predetermined set of tolerances.

4. A capacitance monitoring system comprising a capacitance head having a pair of spaced generally cylindrical measuring electrodes of different lengths positioned to encircle and extend longitudinally of the path of a travelling electric cable, velocity means for measuring the speed of the cable along the path relative to the electrodes, first means providing an output signal indicative of the capacitance between the cable and a first one of the electrodes, second means providing an output signal indicative of the capacitance between the second one of the electrodes and the cable, a first Fast Fourier Transform device for producing a first Fourier analysis of variations in the output signal from the first means to indicate discrete cyclical faults in the cable and the transmission frequencies they would effect when the cable was in use, a second Fast Fourier Transform device for producing a second fast Fourier analysis of variations in the output signal from the second means to indicate cyclical faults in the cable and the transmission frequencies they would effect when the cable was in use, reference table means for storing a first table relevant to the first electrode and a second table relevant to the second electrode of correction factors to correct for attenuation in the cyclical faults detected due to the particular length of each electrode, multiplier means connected to the reference table means and the output of the Fast Fourier Transform devices to correct the attenuation that the detected cyclical faults have suffered due to such lengths of the electrodes with the cyclical faults detected by the first electrode being suppressed over a range of frequencies for which the greatest attenuation occurs, and the correction of faults detected by the second electrode being suppressed over frequencies other than said range.

5. A system according to claim 4, wherein the second electrode is substantially 50% longer than said first electrode.

6. A system according to claim 4, wherein said first electrode has a length in the range of from 80 to 120 mm and the second electrode has a length in the range of from 120 to 180 mm.

* * * * *